(12) United States Patent
Lamorte et al.

(10) Patent No.: US 11,535,159 B2
(45) Date of Patent: Dec. 27, 2022

(54) SYSTEM AND METHODS FOR MOUNTING A PERIPHERAL VEHICULAR DEVICE

(71) Applicant: Faraday & Future Inc., Gardena, CA (US)

(72) Inventors: Christopher W. Lamorte, Anaheim, CA (US); Cian John Francis Brogan, Los Angeles, CA (US)

(73) Assignee: Faraday & Future Inc., Gardena, CA (US)

( * ) Notice: Subject to any disclaimer, the term of this patent is extended or adjusted under 35 U.S.C. 154(b) by 990 days.

(21) Appl. No.: 16/039,189

(22) Filed: Jul. 18, 2018

(65) Prior Publication Data

US 2020/0023774 A1 Jan. 23, 2020

(51) Int. Cl.
*B60R 1/074* (2006.01)
*B60R 1/12* (2006.01)
*G01S 17/931* (2020.01)

(52) U.S. Cl.
CPC ............... *B60R 1/074* (2013.01); *B60R 1/12* (2013.01); *G01S 17/931* (2020.01); *B60R 2001/1223* (2013.01); *B60R 2001/1253* (2013.01)

(58) Field of Classification Search
CPC ... B60R 1/074; B60R 1/12; B60R 2001/1223; B60R 2001/1253
USPC .................................................. 359/841, 877
See application file for complete search history.

(56) References Cited

U.S. PATENT DOCUMENTS

| | | | |
|---|---|---|---|
| 2,871,761 A * | 2/1959 | Suyder | B60R 1/006 |
| | | | 359/840 |
| 4,699,024 A | 10/1987 | Iida et al. | |
| 4,893,916 A | 1/1990 | Sakuma et al. | |
| 5,124,846 A * | 6/1992 | Seitz | B60R 1/074 |
| | | | 359/841 |
| 5,210,651 A | 5/1993 | Shibuya et al. | |
| 5,940,230 A * | 8/1999 | Crandall | B60R 1/074 |
| | | | 359/841 |
| 7,171,726 B2 * | 2/2007 | Kleissen | B60R 1/074 |
| | | | 16/235 |

(Continued)

FOREIGN PATENT DOCUMENTS

WO WO-2017/124038 A1 7/2017

OTHER PUBLICATIONS

Non-Final Office Action dated Jul. 24, 2018, for U.S. Appl. No. 15/482,635, filed Apr. 7, 2017, seventeen pages.

(Continued)

*Primary Examiner* — Ricky D Shafer
(74) *Attorney, Agent, or Firm* — Veros Legal Solutions, LLP

(57) ABSTRACT

A vehicle mirror assembly includes a mirror base configured to attach one or more accessories to the mirror base at an attachment point. The mirror base is attachable to a vehicle door. The vehicle mirror assembly also includes a powerfold assembly. The powerfold assembly includes a motor configured to move the mirror base, a motor assembly shield, a powerfold motor frame surrounding the motor, and a detent mechanism located between the powerfold assembly and the mirror base. The powerfold assembly is located in the vehicle door and is configured to allow movement of the mirror base when the mirror base experiences impact. Methods of manufacturing and operating the mirror assembly are also disclosed.

5 Claims, 11 Drawing Sheets

(56) References Cited

U.S. PATENT DOCUMENTS

| | | | |
|---|---|---|---|
| 7,344,258 B2 * | 3/2008 | MacDougall | B60R 1/10 359/509 |
| 7,354,166 B2 * | 4/2008 | Qualich | B60R 1/025 307/10.1 |
| 7,488,081 B2 * | 2/2009 | Yoshida | B60R 1/074 359/841 |
| 7,887,202 B1 * | 2/2011 | Peterson | B60R 1/074 359/841 |
| 8,662,685 B2 * | 3/2014 | Sim | B60R 1/07 359/841 |
| 8,770,769 B2 * | 7/2014 | Suzuki | B60R 1/074 359/871 |
| 9,033,526 B2 * | 5/2015 | Schuurmans | B60R 1/076 359/841 |
| 10,315,578 B2 * | 6/2019 | Kim | B60R 11/04 |
| 2010/0220406 A1 | 9/2010 | Cuddihy et al. | |
| 2012/0087026 A1 | 4/2012 | Schuurmans et al. | |
| 2014/0268379 A1 | 9/2014 | Kelly | |
| 2014/0297116 A1 | 10/2014 | Anderson et al. | |
| 2015/0217695 A1 | 8/2015 | Millot | |
| 2016/0291134 A1 | 10/2016 | Droz et al. | |
| 2017/0190335 A1 | 7/2017 | Gillett | |
| 2017/0210297 A1 | 7/2017 | Kim et al. | |
| 2019/0143900 A1 * | 5/2019 | Van Houten, II | B60R 1/074 359/841 |

OTHER PUBLICATIONS

International Search Report dated May 24, 2017, for PCT Application No. PCT/US2017/013566, four pages.

* cited by examiner

```
1100 ─┐

┌─ 1102
│  Install one or more gears onto a shaft
│
├─ 1104
│  Install a motor and one or more gears into a powerfold motor frame
│
├─ 1106
│  Install the combined gear and shaft onto the assembly formed in
│  step 1104
│
├─ 1108
│  Install raised detent mechanism
│
└─ 1110
   Install motor assembly shield
```

SYSTEM AND METHODS FOR MOUNTING A PERIPHERAL VEHICULAR DEVICE

FIELD OF THE DISCLOSURE

The present invention relates generally to a peripheral vehicular device. In particular, embodiments of the present invention relate to a modified powerfold assembly that includes a detent mechanism located at the top of the powerfold assembly.

BACKGROUND OF THE DISCLOSURE

Conventionally, mirror powerfold assemblies include a detent mechanism located at the bottom of the powerfold assembly. In some instances, the mirror powerfold assembly is a modular one where the motor is located outside of the mirror head. With the motor located outside of the mirror head, the mirror may resist folding into the vehicle upon impact with a pedestrian, a cyclist, or other object. Under these configurations, the detent mechanism of the assembly can lock, bind, or jam during the impact, making it difficult to pass certain regulations such as the Economic Commission for Europe (ECE) R46 regulation and associated tests such as the Pendulum and Impact Tests.

It is an object of the present invention to overcome the shortcomings of conventional mirror powerfold assemblies for vehicles.

SUMMARY OF THE DISCLOSURE

The embodiments of the present invention includes a modified powerfold assembly for a vehicular peripheral device. The modified powerfold assembly includes a detent mechanism located at the top of the modified powerfold assembly. The detent mechanism is a component in a powerfold assembly used to mechanically resist movement of the associated assembly. The detent mechanism may be useful for preventing movement of the side mirrors while the vehicle is being driven, for example. In some configurations, such as when the motor for a powerfold assembly is located outside of an associated mirror head, the detent mechanism, if not properly configured, can lock, bind, or jam when the mirror assembly is subject to impact.

The present invention includes a modified powerfold assembly having a mirror or camera assembly that freely (i.e., without resistance) folds inwards towards the vehicle during impact. The reduced resistance can minimize damage to the vehicle and the impacted object. Examples of the disclosure include a modified powerfold assembly having a raised detent mechanism. The raised detent mechanism according to the present invention allows for different mirror configurations while addressing the aforementioned shortcomings of conventional mirror powerfold assemblies. The raised detent mechanism enables the modified powerfold assembly to pass certain regulations such as the ECE R46 regulation and associated tests such as the Pendulum and Impact Tests.

In some embodiments, the motor assembly is located in the mirror base. The raised detent mechanism can be located between the modified powerfold assembly and the mirror base. For example, the motor assembly can be located in the door of the vehicle, and the raised detent mechanism can be located between the motor assembly in the door and the mirror base. In some embodiments, the modified powerfold assembly is part of a modular mirror assembly, which includes a camera pod and a mirror configuration.

In one embodiment, a vehicle mirror assembly includes: a mirror base configured to attach one or more accessories to the mirror base at an attachment point, the mirror base attachable to a vehicle door; and a powerfold assembly including: a motor configured to move the mirror base; a motor assembly shield; a powerfold motor frame surrounding the motor; and a detent mechanism located between the powerfold assembly and the mirror base, wherein the powerfold assembly is located in the vehicle door and is configured to allow movement of the mirror base when the mirror base experiences impact.

In some embodiments, the detent mechanism is casted onto the powerfold motor frame.

In some embodiments, the powerfold assembly further includes: one or more first gears; a shaft surrounding the one or more first gears; a pin configured to attach the detent mechanism to the shaft; one or more second gears mechanically coupled to the motor and configured to rotate the one or more first gears; a cap covering an open surface of the motor assembly shield; a thrust bearing attached to the cap; and one or more bushings attached to the shaft.

In some embodiments, the powerfold assembly further includes: one or more first gears; a shaft surrounding the one or more first gears; a pin configured to attach the detent mechanism to the shaft; one or more second gears mechanically coupled to the motor and configured to rotate the one or more first gears; a cap covering an open surface of the motor assembly shield; a thrust bearing attached to the cap; and one or more bearings attached to the shaft.

In some embodiments, the detent mechanism is integrated with at least the shaft.

In some embodiments, the allowed movement is rotational.

In one embodiment, a vehicle mirror assembly includes: a mirror base, including: a mirror base plate attached to a vehicle; and a mirror base blade configured to attach one or more accessories to the mirror base at an attachment point; and a powerfold assembly includes: a motor configured to move the mirror base blade; a motor assembly shield; a powerfold motor frame surrounding the motor; and a detent mechanism located on a surface between the powerfold assembly and the mirror base blade, wherein the powerfold assembly is located in the mirror base plate and is configured to allow movement of the mirror base blade when the mirror base blade experiences impact.

In some embodiments, the plurality of accessories includes at least one of a mirror head and a Lidar sensor.

In some embodiments, the detent mechanism is casted onto the powerfold motor frame.

In some embodiments, the powerfold assembly further includes: one or more first gears; a shaft surrounding the one or more first gears; a pin configured to attach the detent mechanism to the shaft; one or more second gears mechanically coupled to the motor and configured to rotate the one or more first gears; a cap covering an open surface of the motor assembly shield; a thrust bearing attached to the cap; and one or more bushings attached to the shaft.

In some embodiments, the powerfold assembly further includes: one or more first gears; a shaft surrounding the one or more first gears; a pin configured to attach the detent mechanism to the shaft; one or more second gears mechanically coupled to the motor and configured to rotate the one or more first gears; a cap covering an open surface of the motor assembly shield; a thrust bearing attached to the cap; and one or more bearings attached to the shaft.

In some embodiments, the allowed movement is rotational.

In one embodiment, a method of manufacturing a powerfold assembly includes: installing one or more first gears onto a shaft to form a combined gear and shaft; installing a motor and one or more second gears into a powerfold motor frame to form a first powerfold motor frame assembly; installing the combined gear and shaft onto the first powerfold motor frame assembly to form a second powerfold motor frame assembly; installing a raised detent mechanism onto a top surface of the second powerfold motor frame assembly; and installing a motor assembly shield onto the raised detent mechanism and the second powerfold motor assembly.

In some embodiments, installing the raised detent mechanism further includes casting the raised detent mechanism onto the powerfold motor frame.

In some embodiments, the method further includes installing a bushing onto the combined gear and shaft.

In some embodiments, the method further includes installing a bearing onto the combined gear and shaft.

In some embodiments, the method further includes installing a cap onto the second powerfold motor frame assembly.

In some embodiments, the method further includes installing a thrust bearing onto the second powerfold motor frame assembly.

In one embodiment, a method of operating a vehicle including a mirror assembly, the mirror assembly including a detent mechanism and a mirror base capable of attaching one or more accessories to the mirror base at an attachment point, the method includes: colliding with an object at the mirror assembly in a direction of impact; and in response to the collision: unlocking an attachment between the detent mechanism and a portion of the mirror base, wherein unlocking the attachment allows the mirror base to move relative to the detent mechanism; and rotating the mirror assembly tangentially to the direction of impact of the collision.

In some embodiments, the mirror base includes a mirror base plate attached to a body of the vehicle and a mirror base blade configured to move relative to the mirror base plate when the attachment is unlocked.

BRIEF DESCRIPTION OF THE DRAWINGS

The figures are not necessarily to scale, and emphasis is generally placed upon illustrative principles. The figures are to be considered illustrative in all aspects and are not intended to limit the disclosure, the scope of which is defined by the claims.

DETAILED DESCRIPTION

Figure 1A:
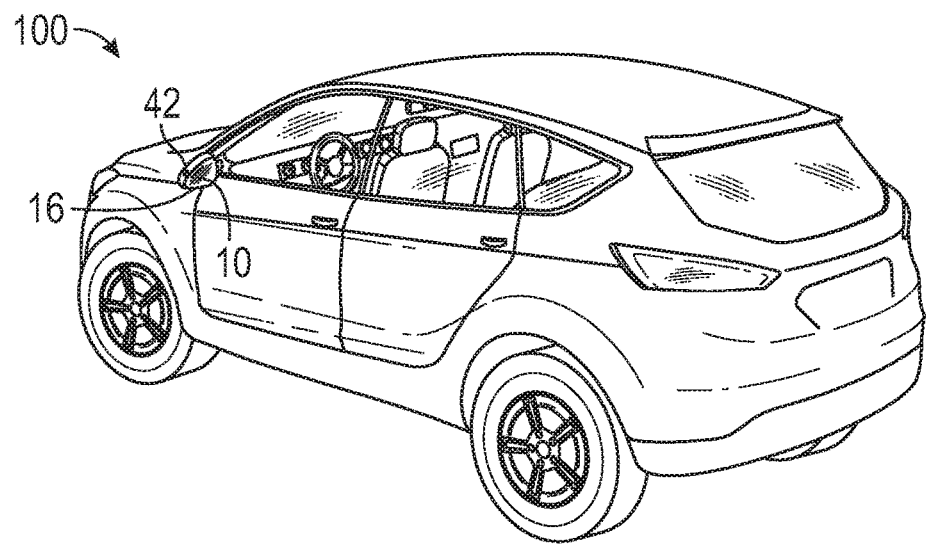
FIG. 1A shows a vehicle outfitted with an exemplary mirror assembly that includes a modified powerfold assembly according to examples of the disclosure.

The embodiments of the present invention includes a modified powerfold assembly for a vehicular peripheral device. The modified powerfold assembly includes a detent mechanism located at the top of the modified powerfold assembly. The modified powerfold assembly can have a mirror or camera assembly that freely (i.e., less resistance) folds inwards towards the vehicle during impact. The reduced resistance can minimize damage to the vehicle and the impacted object.

Examples of the disclosure include a modified powerfold assembly having a raised detent mechanism. The raised detent mechanism according to the present invention allows for different mirror configurations while addressing the aforementioned shortcomings of conventional mirror powerfold assemblies. The raised detent mechanism enables the modified powerfold assembly to pass certain regulations such as the ECE R46 regulation and associated tests such as the Pendulum and Impact Tests.

The embodiments of the present invention also includes methods of manufacturing the modified powerfold assembly.

The mirror powerfold assembly can be a modular one where the motor is located outside of the mirror head (e.g., in the door, in the mirror base, etc.). Mirror powerfold assemblies are equipped with a detent mechanism. The detent mechanism is a component in a powerfold assembly used to mechanically resist movement of the associated assembly. The detent mechanism may be useful for preventing movement of the side mirrors while the vehicle is being driven, for example. Conventionally, the detent mechanism is located below the powerfold assembly. In some configurations, such as when the motor for a powerfold assembly is located outside of an associated mirror head, the detent mechanism, if not properly configured, can lock, bind, or jam when the mirror assembly is subject to impact.

The figures illustrate exemplary mirror assemblies in various configurations, which can be installed on a vehicle. The exemplary mirror assemblies include the modified powerfold assembly. Although a modular mirror assembly is used as a primary example to illustrate embodiments of the modified powerfold assembly, it is understood that the modified powerfold assembly can be installed in other assemblies (e.g., mirror assemblies, camera assemblies, etc.) without departing from the scope of this disclosure. For example, the modified powerfold assembly can be installed in a base of a non-modular mirror assembly. As another example, the modified mirror assembly is installed in a vehicle door, where a non-modular mirror assembly is mated to the door.

For clarity, in some figures, the mirror assembly is shown as isolated without the vehicle, however, it should be understood that the mirror system described herein can be mounted at any location on the vehicle that is convenient to provide the user of the vehicle with views of the surrounding area of the car. Likewise, it is also understood that the modified powerfold assembly and detent mechanism can be appropriately arranged (e.g., size, location, etc.) based on, but not limited to, the geometry of the mirror, its glass size, the size of the vehicle, and the like. The raised detent mechanism can allow the modified power assembly to operate as targeted for a given mode. For example, in one mode, the vehicle is being driven without being hit by an object, so the raised detent mechanism prevents movement of the associated assembly. The raised detent mechanism can prevent movement by locking together an attachment of the modified powerfold assembly and a part of the mirror base. In another mode, an object hits the mirror (or camera), so the raised detent mechanism allows the mirror assembly to move freely, such as folding inwards towards the vehicle during impact. The raised detect mechanism can allow the mirror assembly to move freely by unlocking any attachment between the modified power assembly and a part of the mirror base.

In the illustrations shown in the figures, the modified mirror assembly may be installed on a driver's side door. A similar modified mirror assembly can be supplied on the passenger side of the vehicle. It should be further understood that although the examples described herein refer to a "mirror assembly" and "mirror base" for ease of reference, the assembly need not include a mirror in some configurations, as will be explained in more detail below. For example, the below references to "mirror assembly" and "mirror base" apply to a "camera assembly" and a "camera base," which may be peripheral vehicular devices.

By locating and installing the detent mechanism according to the examples disclosed, the exemplary mirror assemblies can freely (i.e., without resistance) fold inward towards the vehicle during impact, minimizing damage to the vehicle and the impacted object.

The present invention includes a modified powerfold assembly having a mirror or camera assembly that freely (i.e., without resistance) folds inwards towards the vehicle during impact. The reduced resistance can minimize damage to the vehicle and the impacted object. Examples of the disclosure include a modified powerfold assembly having a raised detent mechanism. The raised detent mechanism according to the present invention allows for different mirror configurations while addressing the aforementioned shortcomings of conventional mirror powerfold assemblies. The raised detent mechanism enables the modified powerfold assembly to pass certain regulations such as the ECE R46 regulation and associated tests such as the Pendulum and Impact Tests.

In some embodiments, the motor assembly is located in the mirror base. Alternatively, the raised detent mechanism can be located between the modified powerfold assembly and the mirror base. For example, the motor assembly can be located in the door of the vehicle, and the raised detent mechanism can be located between the motor assembly in the door and the mirror base. In some embodiments, the modified powerfold assembly is part of a modular mirror assembly, which includes a camera pod and a mirror configuration.

Overview of an Exemplary Vehicle

Figure 1B:
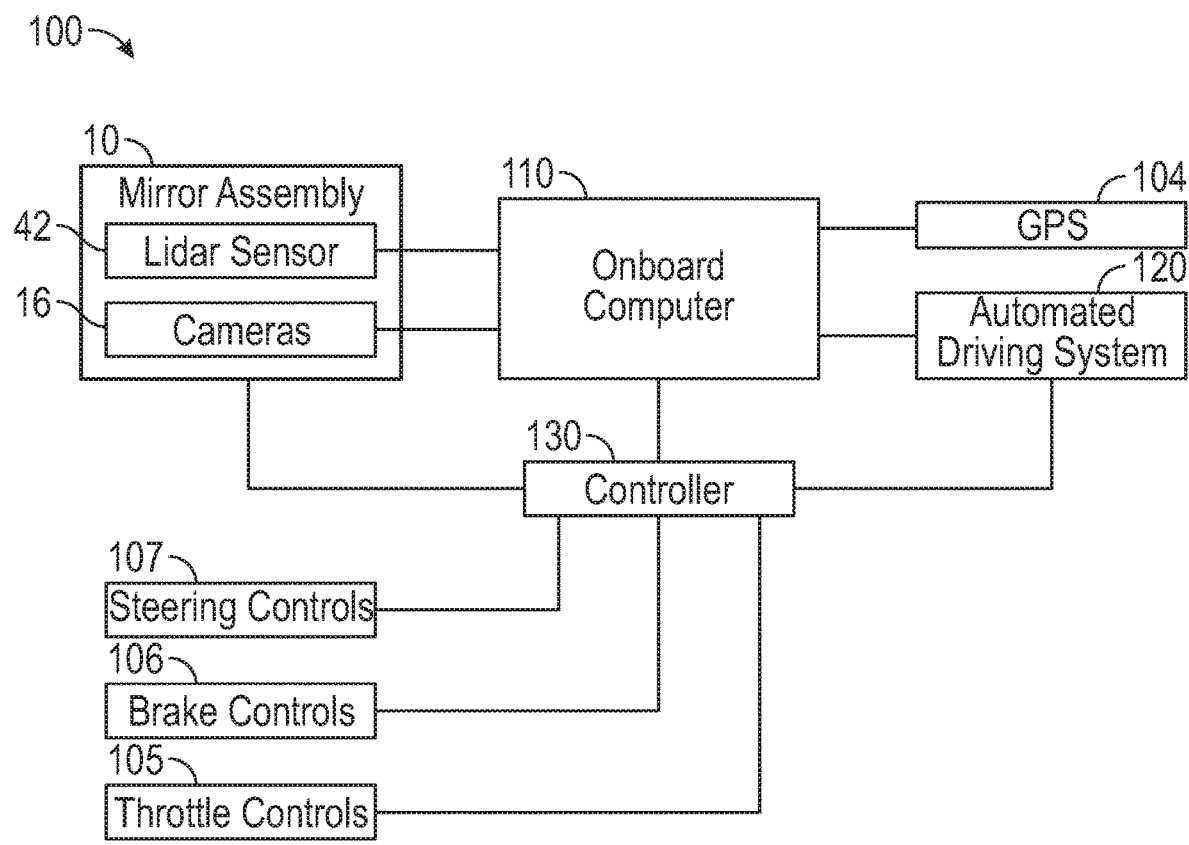
FIG. 1B shows a block diagram of a vehicle outfitted with an exemplary mirror assembly that includes a modified powerfold assembly according to examples of the disclosure.

FIG. 1A illustrates a vehicle 100 outfitted with a mirror assembly 10 according to examples of the disclosure, and FIG. 1B illustrates a simplified block diagram of the same. In some examples, the mirror assembly 10 is a modular assembly. In some examples, vehicle 100 can include a side mirror assembly 10 on the driver's side as shown, and an additional side mirror assembly 10 on the passenger's side (not shown). As discussed in detail below, the modified powerfold assembly of the present invention can be located and installed in a number of locations of the mirror assembly 10, such as in the mirror base, in the vehicle door, and the like.

Vehicle 100 can include steering controls 107, such as a steering wheel to control the movement of the vehicle 100. The vehicle 100 can also include brake controls 106 and throttle controls 105 for controlling movement. Some vehicles can include an automated driving system 120, which can control (or assist a driver in controlling) the steering controls 107, brake controls 106, and throttle controls 105 of the vehicle 100. In some examples, vehicle 100 can further include optical sensors 42, such as Lidar sensors, which can be situated on or around the mirror assembly 10. Sensors 42 can assist the automated driving system 120 by transmitting to it information regarding the surroundings of the vehicle 100. Exemplary sensors 42 can include, but are not limited to, side sensors (which can be located at the driver and passenger side mirror locations), front sensors, rear sensors, and top-mounted sensors. In addition, vehicle 100 can include a global positioning system (GPS) 104, shown in FIG. 1B.

As shown in FIG. 1B, Lidar sensors 42, GPS 104, and cameras 16 can be connected to an onboard computer 110. Onboard computer 110 can control, via controller 130, the mirror assembly 10 using, for example, one or more motor assemblies (not shown). Onboard computer 110 may be further configured to receive, via controller 130, signals from the steering controls 107, brake controls 106, and throttle controls 105. Further, the onboard computer 110 may be further configured to transmit and receive signals from the automated driving system 120.

Overview of an Exemplary Mirror Assembly

Figure 2A:
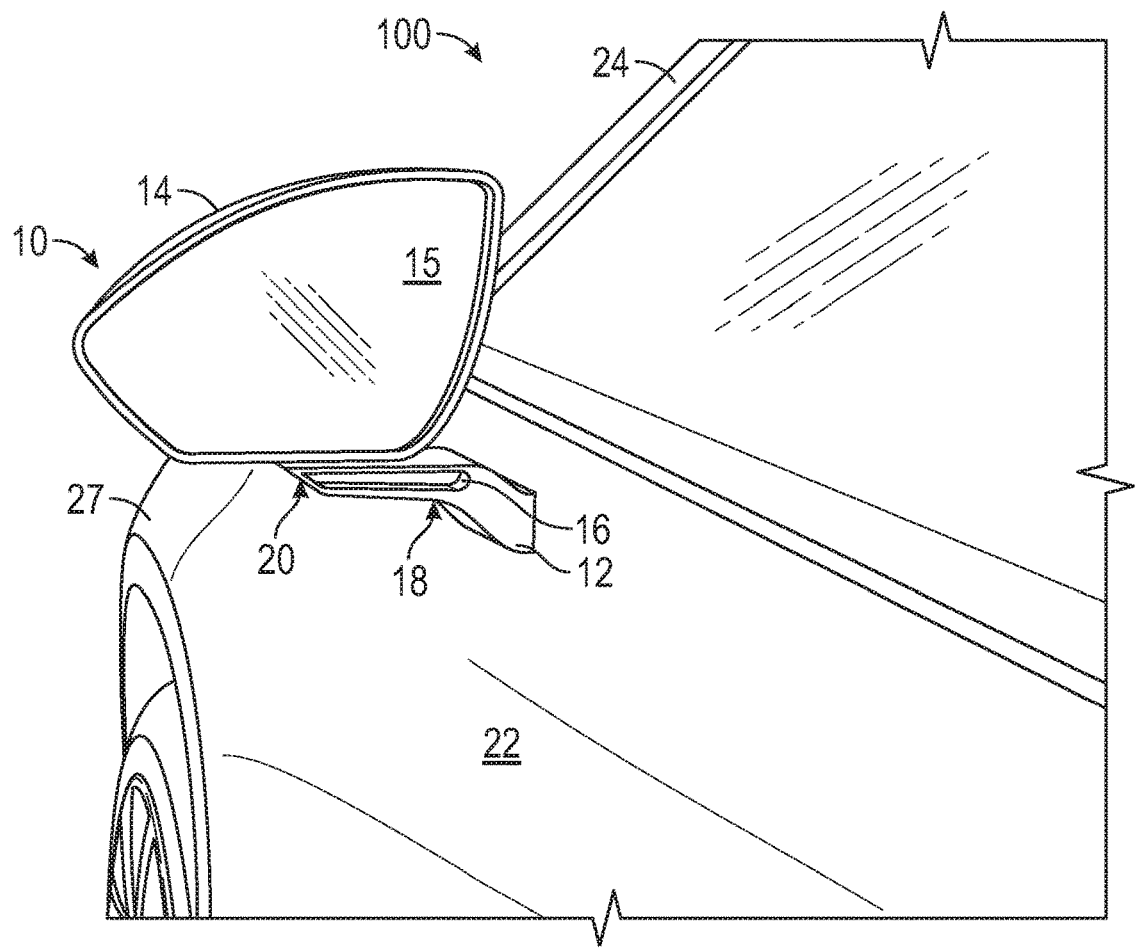
FIGS. 2A-2B show an exemplary mirror assembly having a mirror head attached to a mirror base according to examples of the disclosure.
Figure 2B:
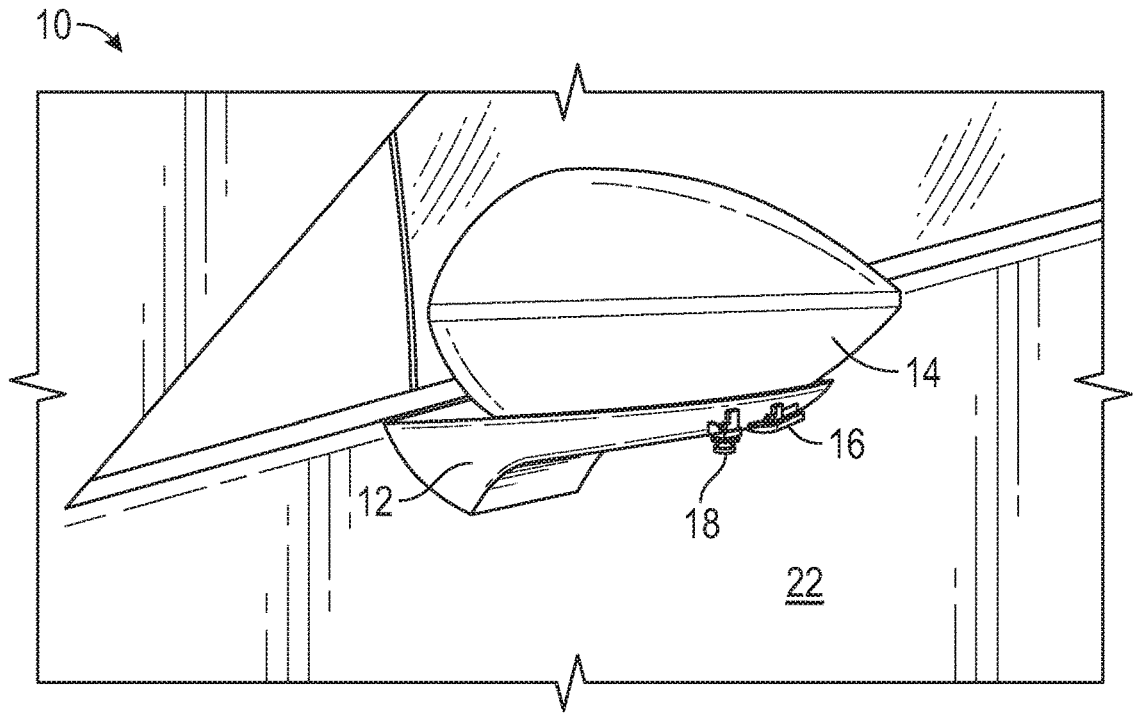

FIGS. 2A-2B show an exemplary mirror assembly having a mirror head attached to a mirror base according to examples of the disclosure. In the driving position, the mirror head 14 can be fully extended, as shown. The mirror base 12 attaches a side view mirror head 14 to the driver side door 22 of vehicle 100. The mirror head 14 can include a mirror face. In some instances, mirror face can be a reflective surface 15. A similar mirror assembly can be supplied on the passenger side of the vehicle (not shown).

In some configurations, mirror assembly 10 and/or mirror base 12 can include one or more cameras or camera assemblies that capture images (e.g., still images and/or video images) of the vehicle's surroundings for display to a driver. The cameras can be configured to capture images in any direction of interest. Cameras that may be included on the vehicle 100 are a rearward facing camera 16, downward facing camera 18, a sideward facing camera 20, a forward-facing camera (not shown), and/or a periphery camera (not shown) that provides a portion of a 360-degree view of the vehicle's surroundings.

The rearward facing camera 16 can emulate a perspective view provided by a typical side view mirror. The periphery camera images the area on the driver side of the vehicle 100. Images from the periphery camera can be combined with images obtained from a similar camera located on the passenger side mirror assembly to give the driver or other vehicle occupant a 360-degree view (or near 360-degree view) of the vehicle's surroundings. Images from the downward facing camera 18 can assist a user in viewing the curb when parallel parking, for example, and also can be used in a guidance system that warns a driver when the vehicle is drifting out of a driving lane. Images or videos captured by the camera(s) can be transmitted to a user display, such as a screen or heads-up display. The camera(s) can be digital or analog.

The mirror base 12 can be attached to a vehicle door 22, an "A" pillar 24, a front quarter panel 27, or any other suitable location, which may vary depending on the vehicle type (e.g., motorcycle) or vehicle design (e.g., sports car).

Modular Mirror Assembly

Figure 3A:
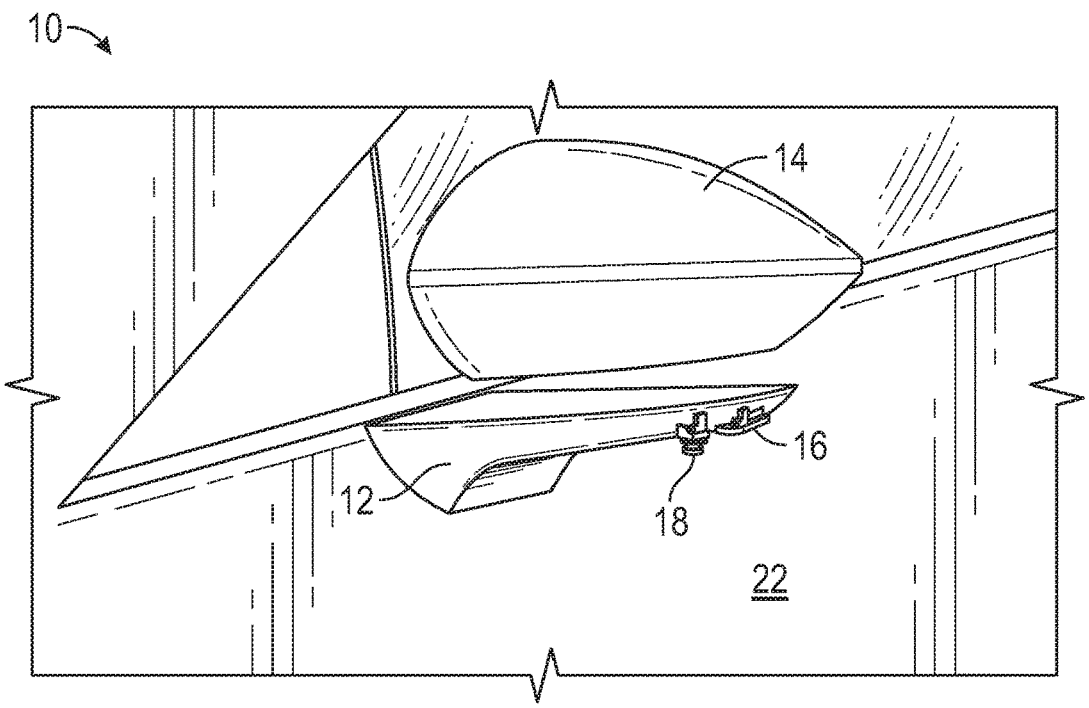
FIGS. 3A-3B show an exemplary modular mirror assembly having a mirror head removed from a mirror base according to examples of the disclosure.
Figure 3B:
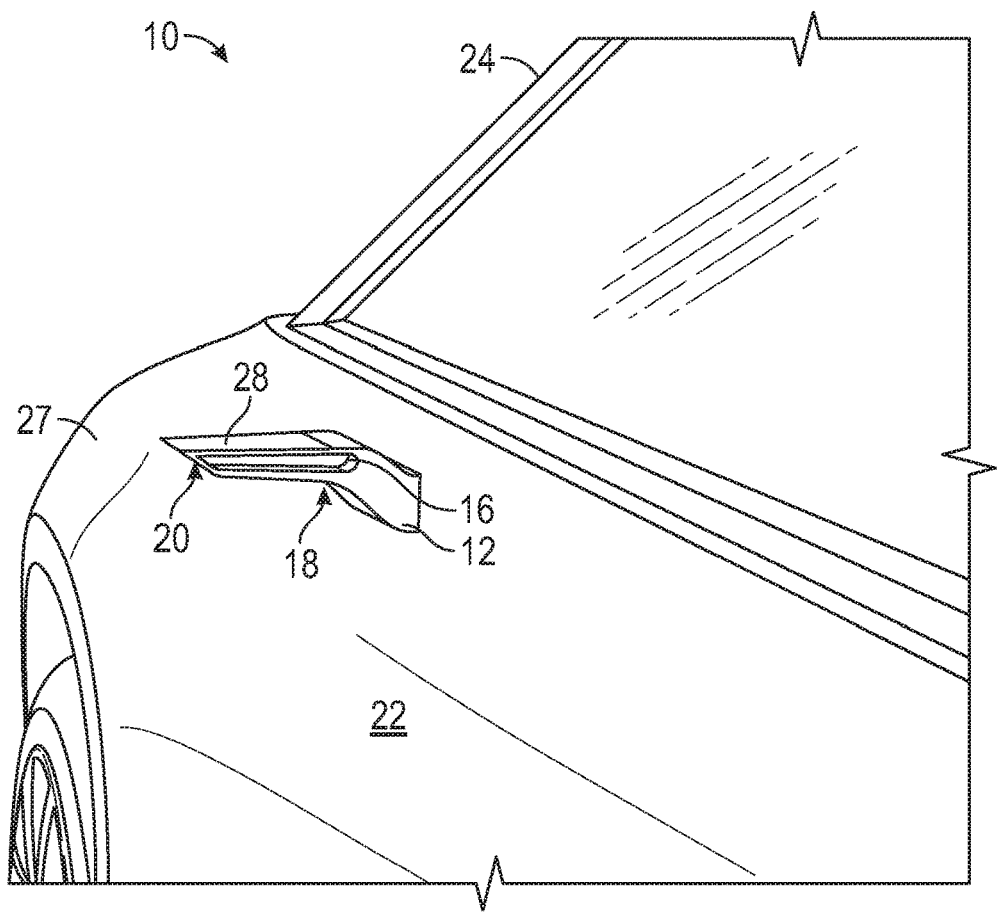

FIGS. 3A-3B show an exemplary modular mirror assembly 10 having a mirror head 14 removed from a mirror base 12 according to examples of the disclosure. The cameras 16, 18, and 20 can be attached to the mirror base 12, which can be attached to the vehicle door 22. The cameras 16, 18, and 20 can be fully functional. The modified powerfold assembly of the present invention (not shown) can be included in a modular mirror assembly can be located inside the door 22 or can be located in the mirror base 12.

In some examples, side view mirror head 14 can be removably coupled to the mirror base 12. For example, mirror base 12 can include a magnetic component (not shown) that is configured to secure mirror head 14 to the mirror base 12 using a corresponding magnetic component (not shown) in the mirror head 14. In other configurations, a single magnetic component may be used, for example when the corresponding mirror head 14 or mirror base 12 is made of a magnetic material. The magnetic component of the mirror base and/or mirror head can have any size, shape, and number of magnets as necessary to achieve magnetic attraction there between such that there is enough magnetic force to hold the mirror head 14 in place relative to the mirror base 12 when a connection is desired. The magnetic component of the mirror base and/or mirror head can also be configured such that the mirror head 14 can be removed from the mirror base 12 if needed, for example, for repair or replacement, or separation from vehicle 100 during a collision. Additionally or alternatively to separating the mirror head, the mirror base 12 folds inwards towards the vehicle 100 (e.g., door 22) during a collision. In some examples, the magnetic attraction can be achieved using electromagnetic forces alone or in combination with the above mentioned solutions.

A removable cap 28 can be attached to the mirror base 12 to cover any openings or fasteners, such as electrical or mechanical connections, that are exposed when the mirror head 14 is detached from the mirror base 12. The removable cap 28 protects these electrical or mechanical connections and can also be stylized to enhance vehicle aesthetics. The mirror head 14 can be configured to accept or store the removable cap 28 when the cap is not in use, to prevent loss of or damage to the cap, and to facilitate delivery of the cap at the time of vehicle purchase without the need for third party involvement.

Figure 4A:
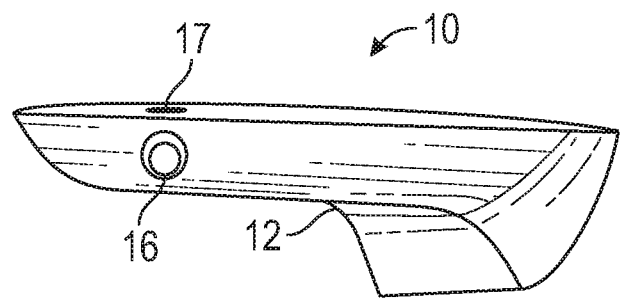
FIG. 4A shows an exemplary mirror base, which can be installed on a vehicle, according to examples of the disclosure.
Figure 4B:
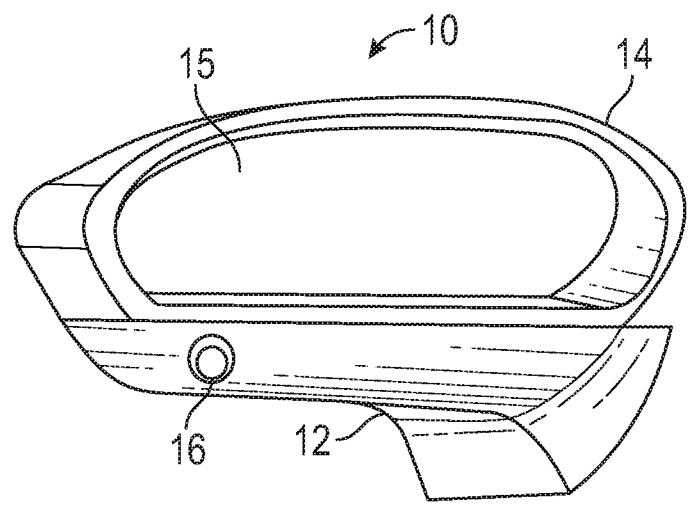
FIG. 4B shows an exemplary mirror base with a modular mirror head attached to the mirror base according to examples of the disclosure.

FIGS. 4A-4B illustrate an exemplary mirror assembly in various configurations, which can be installed on a vehicle. In some examples, the mirror assembly 10 is a modular mirror assembly that includes the disclosed modified powerfold assembly of the present invention. For clarity, the modular mirror assembly 10 is shown as isolated without the vehicle, however, it should be understood that the modular mirror system described herein can be mounted at any location on the vehicle that is convenient to provide the user of the vehicle with views of the surrounding area of the car.

FIG. 4A illustrates a mirror base 12, which can be included in the modular mirror assembly 10. Mirror base 12 can be attached to a vehicle door, an "A" pillar, a front quarter panel, or any other suitable location, which may vary depending on the vehicle type (e.g., motorcycle) or vehicle design (e.g., sports car). In some configurations, mirror base 12 can include one or more cameras or camera assemblies that capture images (e.g., still images and/or video images) of the vehicle's surroundings for display to a driver. For example, the mirror base 12 can include a rearward facing camera 16. In some examples, mirror base 12 can include an attachment point 17, which can be covered by a removable cap.

Referring to FIG. 4B, an exemplary mirror assembly 10 is shown with a mirror head 14. Mirror head 14 can further include a mirror face 15. Mirror assembly 10 can be attached via at least one attachment point (e.g., attachment point 17 illustrated in FIG. 4A). In some configurations, one or more motor assemblies (not shown) can be inside the door 22 and/or mirror base 12. These motor assemblies can be used to move the mirror head 14 and/or the mirror face 15.

Conventional Mirror Assembly

Figure 5A:
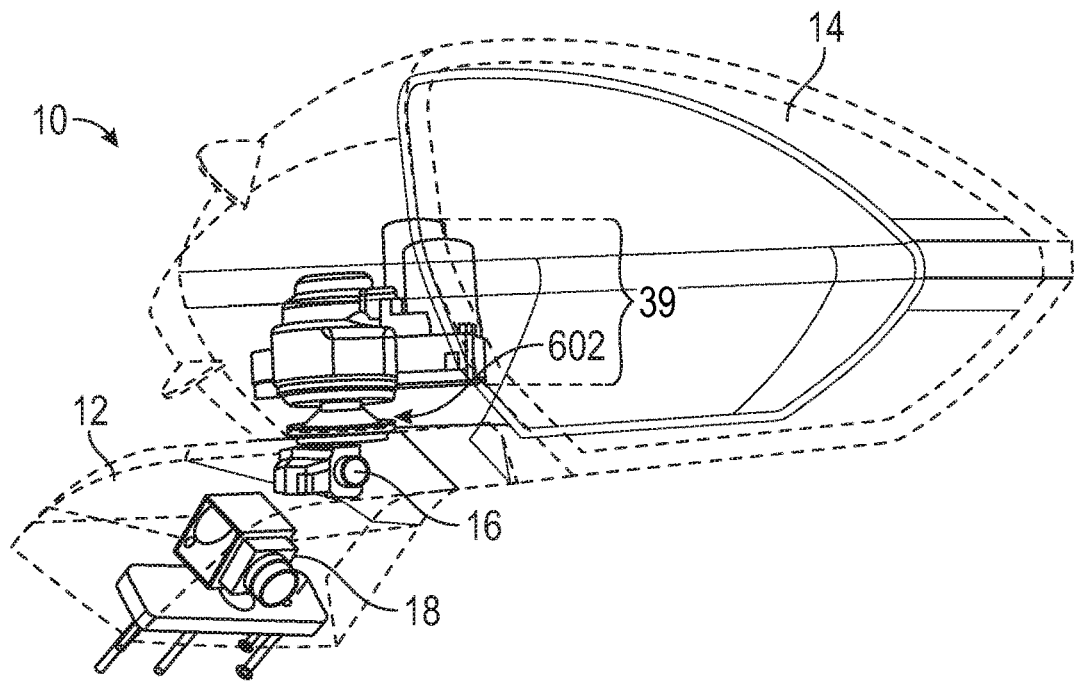
FIG. 5A shows a detailed diagram of an exemplary conventional mirror assembly including a mirror head and mirror base according to examples of the disclosure.
Figure 5B:
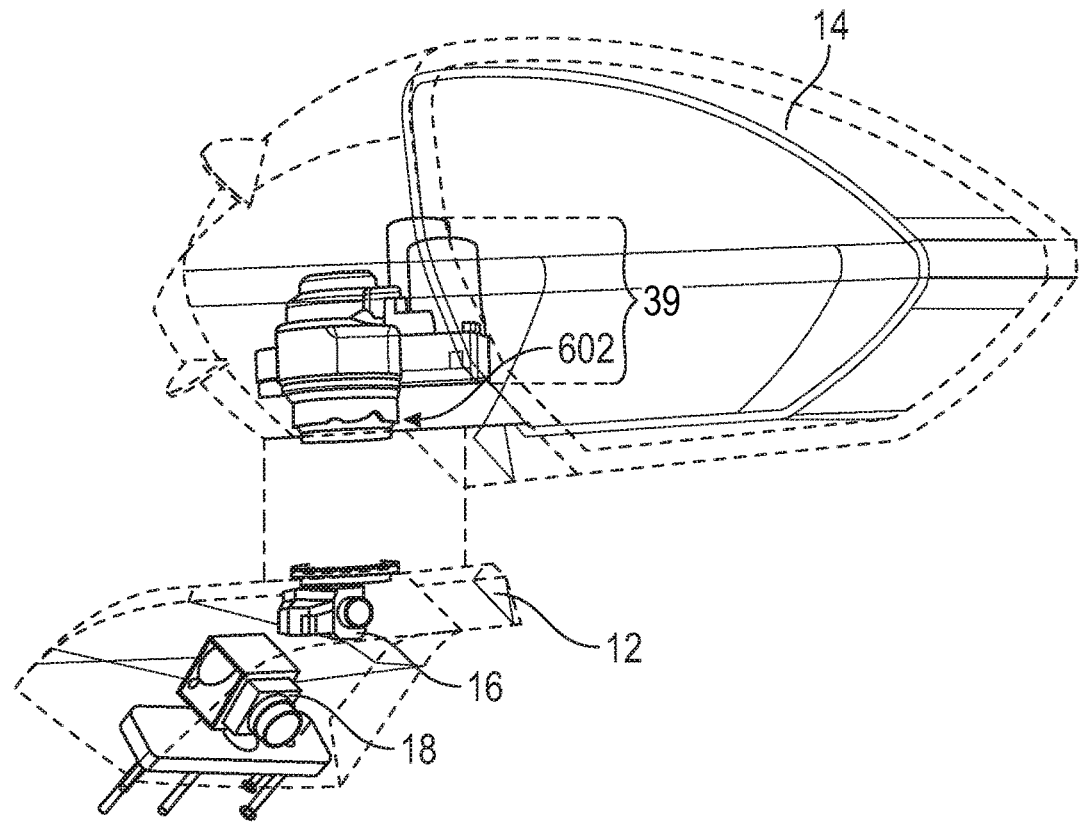
FIG. 5B shows an exemplary conventional mirror assembly having a mirror head separated from its counterpart mirror base according to examples of the disclosure.

FIGS. 5A-5B show diagrams of an exemplary conventional mirror assembly including a mirror head 14 and mirror base 12 having a detent mechanism 602 located below the powerfold assembly 39. The figures reveal the powerfold assembly 39 and components of the camera assembly, such as a rearward facing camera 16, downward facing camera 18, and associated electrical connector(s) (not shown). In some instances, the mirror base 12 is divided into two or more segments that move relative to one another when the powerfold motor (included in the powerfold assembly) is actuated.

Figure 6:
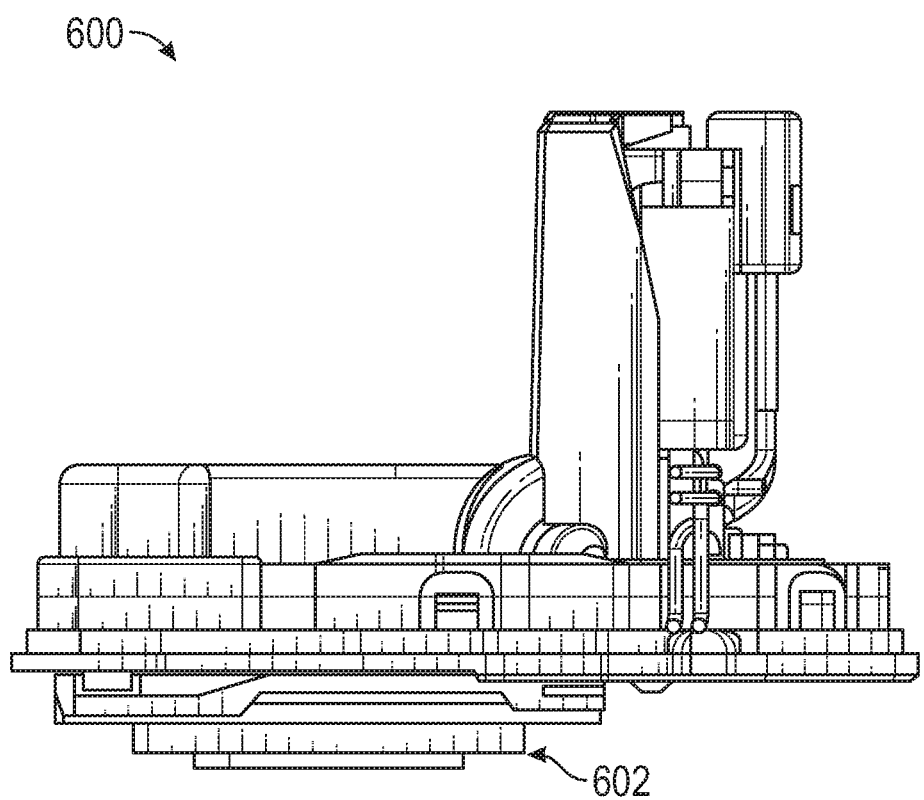
FIG. 6 shows an exemplary modified powerfold assembly including a detent mechanism located at the bottom according to examples of the disclosure.

FIG. 6 shows an exemplary modified powerfold assembly including a detent mechanism located at the bottom according to examples of the disclosure. The powerfold assembly 600 can be substantially similar to the powerfold assembly 39 in FIGS. 5A-5B. The detent mechanism 602 is located on the bottom of the powerfold assembly 600. For example, the powerfold assembly 600 can be installed in a mirror head of a non-modular mirror assembly or the mirror head 14 described in FIGS. 5A-5B. In a conventional modular mirror assembly, the detent mechanism 602 is installed on the bottom of the powerfold assembly 600, and the powerfold assembly 600 is installed outside the mirror head (e.g., in the door, in the mirror base). Impact by an object will cause a load on the powerfold assembly 600 (e.g., when the mirror collides with an object), which may cause the detent mechanism 602 to lock, bind, or jam.

Modified Powerfold Assembly

Figure 7:
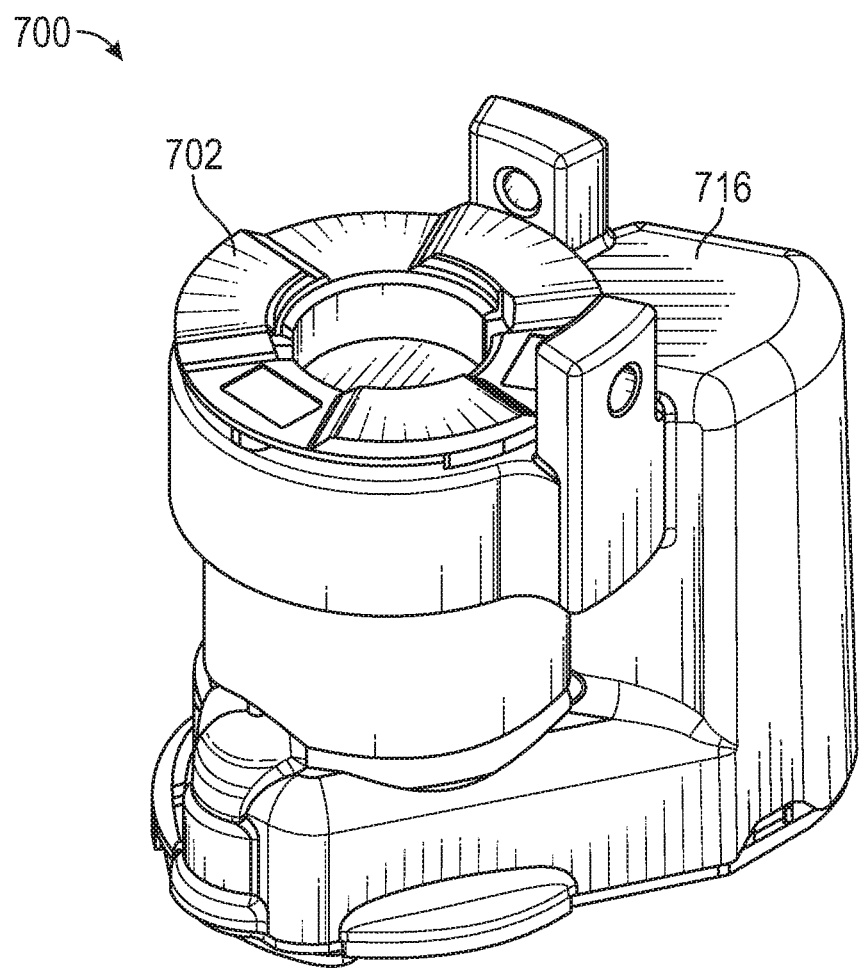
FIG. 7 shows an exemplary modified powerfold assembly according to the examples of the disclosure.

FIG. 7 shows an example of a modified powerfold assembly 700 according to the examples of this disclosure. The disclosed modified powerfold assembly addresses the aforementioned problems of locking, binding, or jamming of the detect mechanism, specifically for powerfold assemblies located outside the mirror head of a mirror assembly (e.g., in a modular mirror assembly). The modified powerfold assembly 700 includes a raised detent mechanism 702, a motor assembly shield 716, and a powerfold motor frame. The powerfold motor frame is located inside the motor assembly shield 716 and hidden from view. The powerfold motor frame is discussed in more detail below (e.g., powerfold motor frame 810 illustrated in FIG. 8). The modified powerfold assembly may include additional components not illustrated in the figure, some of which are described below. In contrast with the conventional powerfold assembly illustrated in FIG. 6, the detent mechanism can allow the mirror head and/or mirror base to move freely (i.e., without resistance). The detent mechanism 702 can allow the mirror assembly to fold inwards towards the vehicle during impact.

The raised detent mechanism 702 can located between the body of the modified powerfold assembly 700 and the mirror base (e.g., mirror base 12 illustrated in FIGS. 3A-3B). In some embodiments, the raised detent mechanism 702 is integrated (i.e., becomes an inseparable part) into the powerfold motor frame and is casted into the motor frame. In some embodiments, the raised detent mechanism 702 is integrated with other parts of the modified powerfold assembly 700. In some embodiments, the detent mechanism is integrated with at least a shaft (e.g., combined gear and shaft 806 of FIG. 8, as discussed below) of the modified powerfold assembly 700. In some examples, the integrated part can perform at least the functions of the raised detent mechanism 702.

In some embodiments, the modified powerfold assembly 700 is located in a mirror base of a mirror assembly. In some embodiments, the modified powerfold assembly 700 is located in a vehicle door, where a mirror assembly mates with the door.

It is understood that the raised detent mechanism is not limited to being located between the modified powerfold assembly and the mirror base. The raised detent mechanism can be appropriately arranged (e.g., size, location, etc.) based on, but not limited to, the geometry of the mirror, the glass size, and the vehicle size. The raised detent mechanism can allow the modified power assembly to operate as targeted for a given mode. For example, in one mode, the vehicle is being driven without being hit by an object, so the raised detent mechanism prevents movement of the associated assembly. The raised detent mechanism can prevent movement by locking together an attachment of the modified powerfold assembly and a part of the mirror base. In another mode, an object hits the mirror (or camera), so the raised detent mechanism allows the mirror assembly to move freely, such as folding inwards towards the vehicle during impact. The raised detect mechanism can allow the mirror assembly to move freely by unlocking any attachment between the modified power assembly and a part of the mirror base.

Although the modified powerfold assembly 700 is assembled as shown in the figure, it is understood that parts of the modified powerfold assembly can be assembled differently from the illustrated configuration without departing from the scope of this disclosure. Furthermore, although the modified powerfold assembly 700 is shown as including the described components, it is also understood that the modified powerfold assembly can include additional components, less components, or repeated components, compared to the illustrated or described components, without departing from the scope of this disclosure. Furthermore, it is understood that the illustrated components can have different mechanical properties without departing from the scope of this disclosure. In some embodiments, different configurations or inclusion of components also form a modified powerfold assembly that includes a raised detent mechanism.

The modified powerfold assembly, when located outside of a mirror head, reduces or removes a rotational resistance of a mirror base of a mirror assembly (e.g., allows the mirror head and/or mirror base to move freely) when the mirror base experiences impact. The reduced resistance can minimize damage to the vehicle and the impacted object. In some embodiments, in response to impact from a colliding object, the modified powerfold assembly unlocks an attachment between an attachment of the modified powerfold assembly and a part of the mirror base, allowing at least a part of the mirror base to move relative to the detent mechanism.

In some embodiments, the motor assembly is located in the mirror base. The raised detent mechanism can be located between the modified powerfold assembly and the mirror base. For example, the motor assembly can be located in the door of the vehicle, and the raised detent mechanism can be located between the motor assembly in the door and the mirror base. In some embodiments, the modified powerfold assembly is part of a modular mirror assembly, which includes a camera pod and a mirror configuration.

Figure 8:
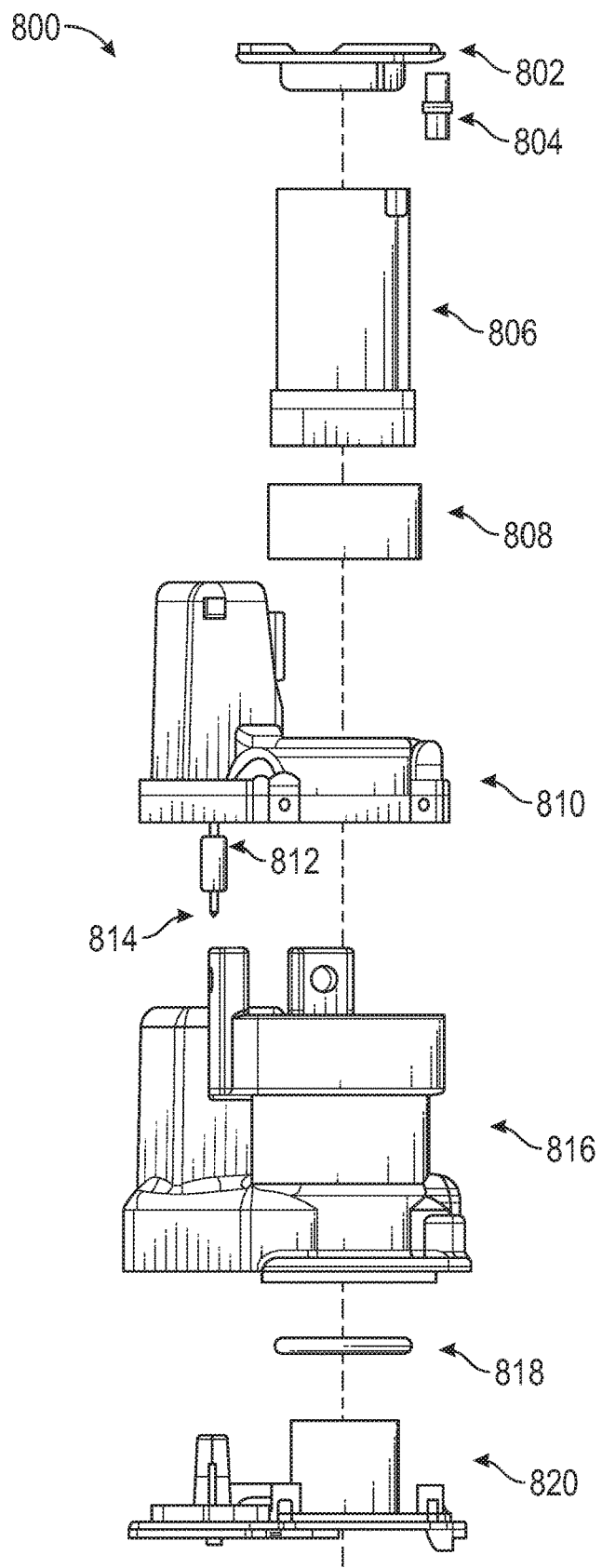
FIG. 8 shows components included in an exemplary modified powerfold assembly according to the examples of the disclosure.

FIG. 8 illustrates a disassembled modified powerfold assembly 800 according to examples of this disclosure. The disassembled modified powerfold assembly includes raised detent mechanism 802, a pin 804, a combined gear and shaft 806, bushing 808, a powerfold motor frame 810, a motor 812, a gear 814, a motor assembly shield 816, thrust bearing 818, and a cap 820.

In some embodiments, the motor 812 is configured to move a mirror base of a mirror assembly. In some embodiments, the motor 812 is configured to move a mirror base blade of a mirror assembly. In some embodiments, the mirror assembly is the disclosed modular mirror assembly. In some embodiments, the powerfold motor frame 810 surrounds the motor 812.

In some embodiments, the pin 804 is configured to attach the detent mechanism 802 to the shaft 806. The shaft 806 can be a combined gear and shaft, in some examples. In some embodiments, the gear 814 is mechanically coupled to the motor 812 and configured to rotate the shaft 806. The thrust bearing 818 attaches to the cap 820. In some embodiments, the cap 820 covers an open surface of the motor assembly shield 816. For example, the open surface is the uncovered bottom surface of the motor assembly shield.

In some embodiments, the bushing 808 is attached to the combined gear and shaft 806. In some embodiments, bushing 808 is replaced with a bearing. In some embodiments, the raised detent mechanism 802 is part of the powerfold motor frame 810 and is casted into it. For example, the detent mechanism 802 is molten with the motor frame 810 to form an inseparable part. In some embodiments, the raised detent mechanism 802 is combined with other parts of the modified powerfold assembly 800.

Although the disassembled modified powerfold assembly 800 is arranged as shown in the figure, it is understood that the parts of the modified powerfold assembly can be assembled differently from the illustrated arrangement without departing from the scope of this disclosure. It is also understood that the configuration shown in FIG. 8 does not imply an order of installation steps or manufacturing steps of the modified powerfold assembly. Although the disassembled modified powerfold assembly 800 is illustrated to include the described components, it is also understood that the modified powerfold assembly can include additional components, less components, or repeated components, compared to the illustrated components, without departing from the scope of this disclosure. Furthermore, it is understood that the illustrated components can have different mechanical properties without departing from the scope of this disclosure. Specifically, in some embodiments, different configurations or inclusion of components also form a modified powerfold assembly that includes a raised detent mechanism.

The modified powerfold assembly, when located outside of a mirror head, reduces a rotational resistance of a mirror base of a mirror assembly (e.g., allows the mirror head and/or mirror base to move) when the mirror base experiences impact. In some embodiments, in response to the impact caused by a collision with an object, the modified powerfold assembly unlocks an attachment between the detent mechanism and a location of the mirror base, allowing at least a part of the mirror base to move relative to the detent mechanism. In some embodiments, the modified powerfold assembly is in the vehicle door. In some embodiments, the modified powerfold assembly is in a mirror base plate of the mirror base. In some examples, the direction of the rotational motion is tangential to the direction of the impact caused by a collision with an object. For example, the mirror assembly is less resistant (e.g., allowed to move) to folding in towards the vehicle during impact, minimizing damage to the vehicle and the impacted object.

Figure 9A:
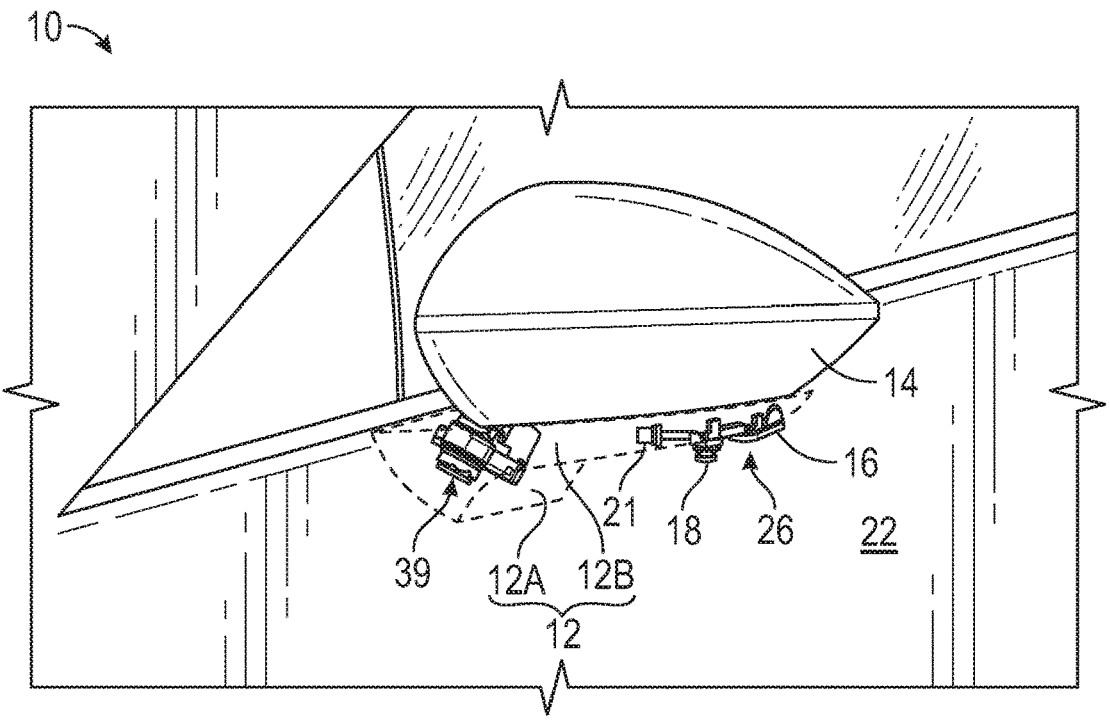
FIGS. 9A-9B show diagrams of an exemplary mirror assembly with details of its motor assembly included in the mirror base according to examples of the disclosure.
Figure 9B:
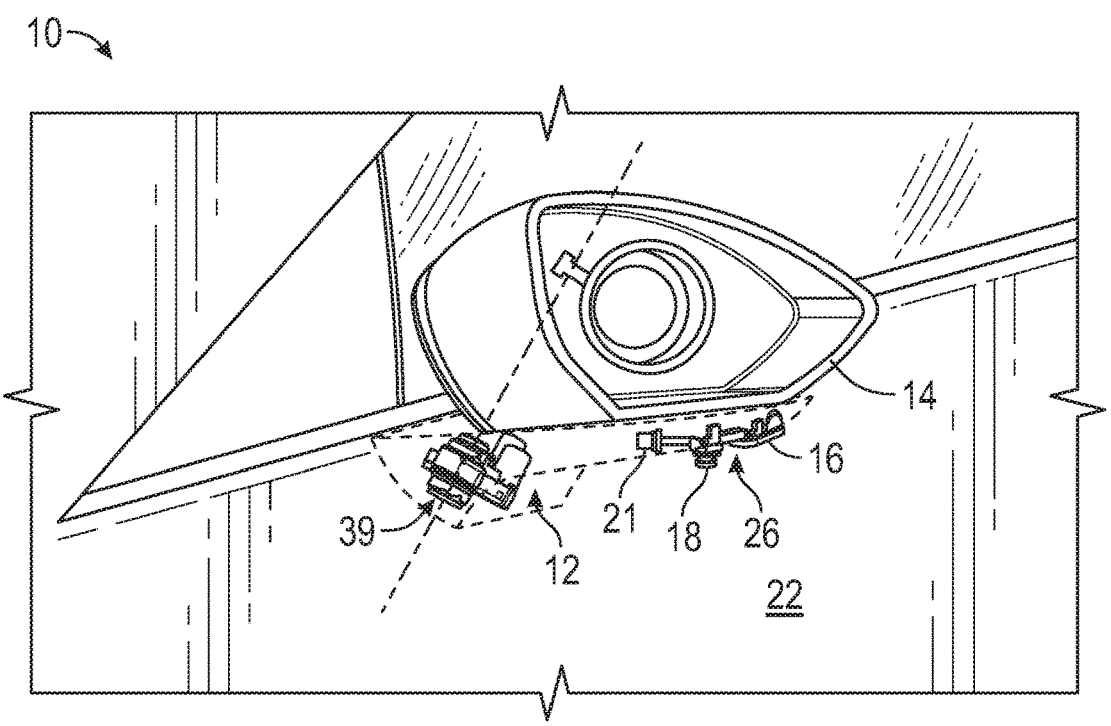

FIGS. 9A-9B show diagrams of the mirror base 12, revealing the modified powerfold assembly 39 and components of the camera assembly, such as a rearward facing camera 16, downward facing camera 18, and electrical connector 21 for the camera assembly 26. In some examples, the modified powerfold assembly 39 is substantially similar to the disclosed modified powerfold assembly. In contrast with FIGS. 5A-5B, which illustrate a powerfold assembly being located in the mirror head, the modified powerfold assembly 39 is located in the mirror base 12, as shown in FIGS. 9A-9B. In some embodiments, the modified powerfold assembly is located in the vehicle door 22. The raised detent mechanism of the modified powerfold assembly can be located between the mirror base 12 and the modified powerfold assembly 39 or between the mirror base and the modified powerfold assembly.

In some instances, the mirror base is divided into two or more segments that move relative to one another when the motor of the powerfold assembly is actuated. Mirror base plate 12A contacts the door 22 and secures the mirror assembly 10 to the door 22. Mirror base blade 12B supports the modular mirror head 14 and is rotably connected to the mirror base plate 12A, allowing the mirror base blade 12B and mirror head 14 to pivot relative to the mirror base plate 12A. In some embodiments, the mirror head and the mirror base rotate inward or fold inward toward the vehicle upon impact with a passing pedestrian, cyclist, or other objects.

Figure 10A:
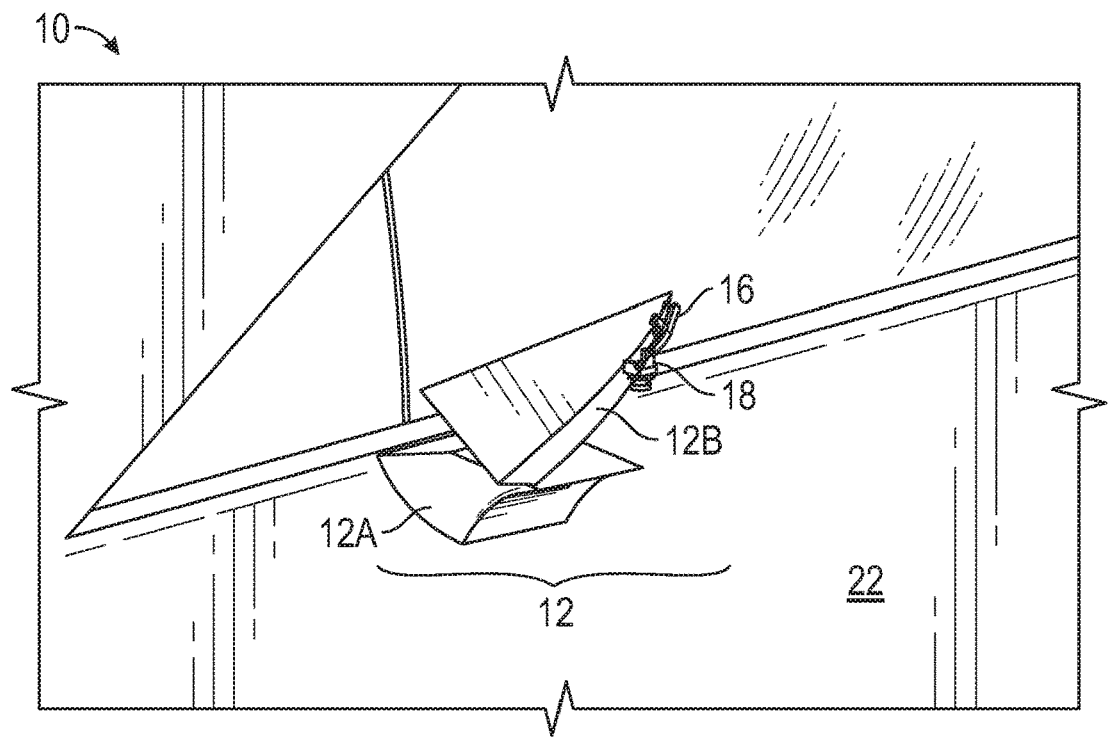
FIG. 10A shows an exemplary mirror assembly having its mirror base in a folded position against the vehicle door according to examples of the disclosure.

FIG. 10A shows a mirror base 12 comprising mirror base plate 12A and mirror base blade 12B. The modified powerfold assembly can be installed in the mirror base 12 or in the vehicle door 22. In some embodiments, the raised detent mechanism of the modified powerfold assembly is located between the mirror base 12 and the body of the modified powerfold assembly. In some embodiments, the raised detent mechanism is located between the mirror base 12 and the body of modified powerfold assembly.

The figure illustrates the mirror base blade 12B in a folded position against the vehicle door 22. In some examples, the mirror base blade 12B is in a folded position against the vehicle door after a collision with a pedestrian, cyclist, or an object. In some examples, the mirror base blade 12B is rotated inward toward the vehicle using a motor when the vehicle is parked or turned off, to reduce the overall width of the vehicle and to reduce the likelihood of the mirror assembly 10 or mirror head 14 being damaged by passing pedestrians, cyclists, or other vehicles.

The mirror base blade 12B rotates relative to the mirror base plate 12A, which houses the powerfold assembly. Preferably, the mirror assembly 10 is no wider than the overall width of the vehicle body when the mirror base blade 12B is folded against the door 22. A significant advantage of a folding mirror base blade 12B, with or without the modular head 14 attached, is that camera(s) 16, 18 located on the mirror base blade 12B also move, which enables the driver to alter the viewing angle of the cameras 16, 18 simply by moving the mirror base blade 12B. Thus, the disclosure includes the ability for the driver or a passenger to selectively move the mirror base 12 to provide additional viewing perspectives of the vehicle's surroundings.

Figure 10B:
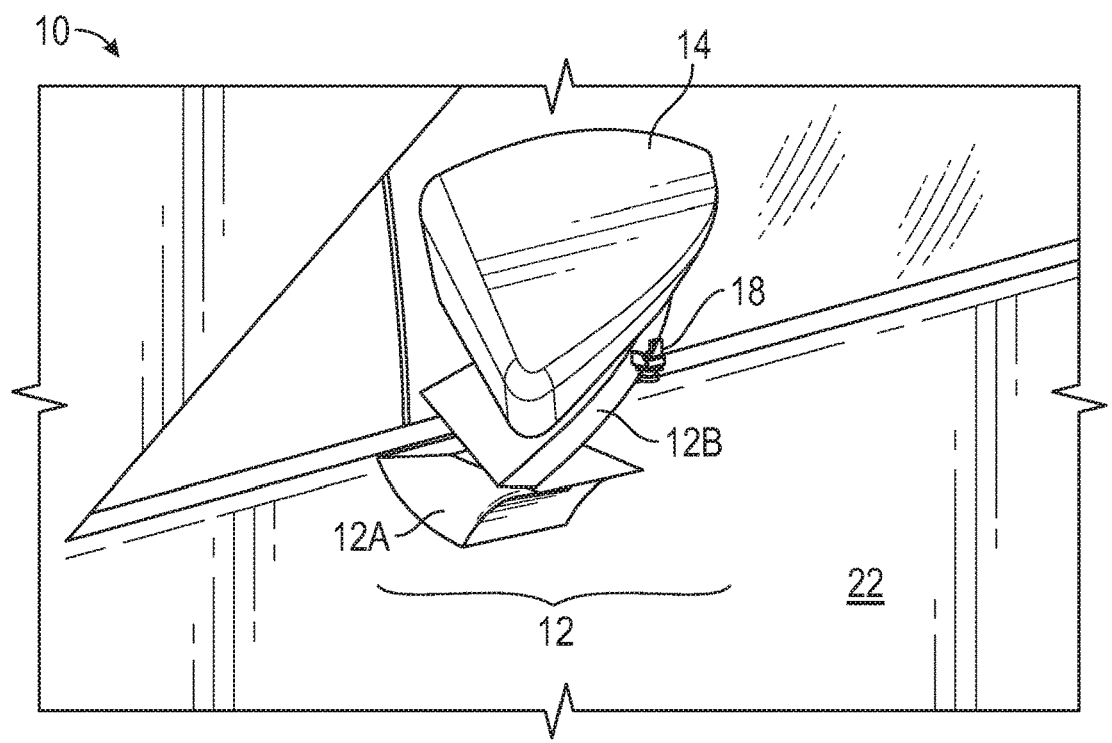
FIG. 10B shows an exemplary mirror assembly having a mirror head attached to a mirror base, where the mirror head is in a folded position against the vehicle door according to examples of the disclosure.

FIG. 10B shows an exemplary mirror assembly having a mirror head attached to a mirror base, where the mirror head is in a folded position against the vehicle door according to examples of the disclosure. The embodiments of the disclosure include the modified powerfold assembly of the present invention as applied to a mirror assembly having a mirror head attached. The modified powerfold assembly can have a raised detent mechanism. The raised detent mechanism can allow the modified power assembly to operate as targeted for a given mode. For example, in one mode, the vehicle is being driven without being hit by an object, so the raised detent mechanism prevents movement of the associated assembly. The raised detent mechanism can prevent movement by locking together an attachment of the modified powerfold assembly and a part of the mirror base. In another mode, an object hits the mirror (or camera), so the raised detent mechanism allows the mirror assembly to move freely, such as folding inwards towards the vehicle during impact, as shown in the figure. The raised detect mechanism can allow the mirror assembly to move freely by unlocking any attachment between the modified power assembly and a part of the mirror base 12.

Camera Assembly

Figures 10C, 11:
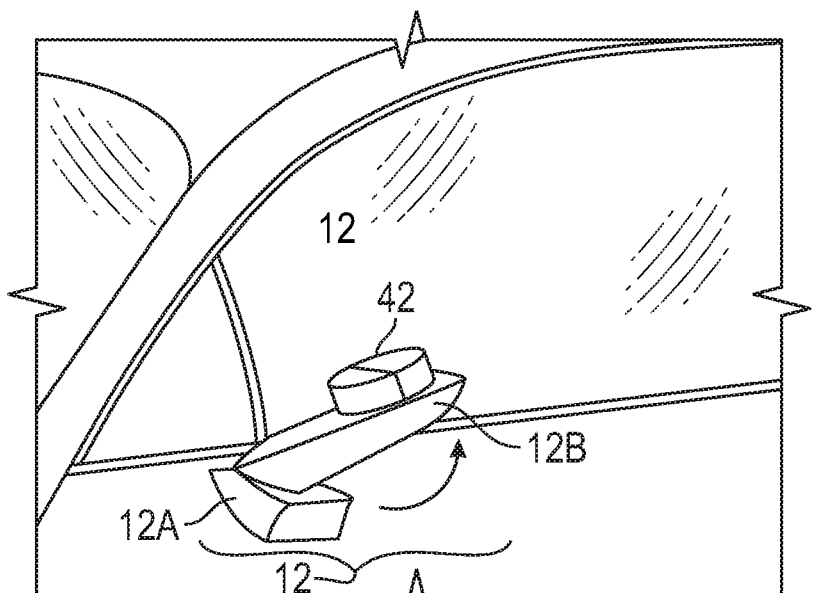
FIG. 10C shows an exemplary mirror assembly having a Lidar sensor attached to a mirror base, where the Lidar sensor is in a folded position against the vehicle door according to examples of the disclosure.
FIG. 11 shows an exemplary method of manufacturing a modified powerfold assembly according to the examples of the disclosure.

FIG. 10C shows an exemplary mirror assembly with a Lidar sensor 42 attached in a folded position against the vehicle door. The embodiments of the present invention include a modified powerfold assembly used in a camera assembly.

The mirror base blade 12B can have a Lidar sensor attached to it. Upon collision with a pedestrian, cyclist, or an object, the detect mechanism can allow the mirror base blade 12B to rotate inward toward the vehicle without resistance, locking, jamming, or binding.

Although folded positions of the mirror base blade and/or the mirror head are shown in FIGS. 10A-10C for simplicity, it should be understood that the mirror base and/or the mirror head can be configured to fold, pivot, or rotate at any position according to the geometries of the mirror base, the mirror head, the sensor, or the like.

Exemplary Fabrication of a Modified Powerfold Assembly

FIG. 11 shows an example of a method 1100 of manufacturing a modified powerfold assembly according to the examples of the disclosure. The method 1100 includes installing one or more gears onto a shaft (step 1102). A bushing or a bearing can be installed onto the combined gear and shaft. A motor and one or more gears are installed into a powerfold motor frame (step 1104). The powerfold motor frame can be a component included in the modified powerfold assembly.

In step 1106, the combined gear and shaft (from step 1102) is installed onto the modified powerfold assembly, the motor, and one or more gears (from step 1104). Optionally, the assembly formed in step 1106 is installed onto a cap. In some embodiments, the assembly formed in step 1106 is installed onto a thrust bearing.

A raised detent mechanism is installed at the top of the assembly including the combined gear and shaft, the powerfold motor frame, the motor, and the one or more gears (step 1108). In some embodiments, the detent mechanism is part of the powerfold motor frame and is casted into the motor frame. In some embodiments, the raised detent mechanism is integrated with other parts of the modified powerfold assembly, such as the shaft of the modified powerfold assembly.

It is understood that the raised detent mechanism is not limited to being installed on top of the powerfold assembly. The raised detent mechanism can be appropriately arranged (e.g., size, location, etc.) based on, but not limited to, the geometry of the mirror, the glass size, and the vehicle size. The raised detent mechanism can allow the modified power assembly to operate as targeted for a given mode. For example, in one mode, the vehicle is being driven without being hit by an object, so the raised detent mechanism prevents movement of the associated assembly. The raised detent mechanism can prevent movement by locking together an attachment of the modified powerfold assembly and a part of the mirror base. In another mode, an object hits the mirror (or camera), so the raised detent mechanism allows the mirror assembly to move freely, such as folding inwards towards the vehicle during impact. The raised detect mechanism can allow the mirror assembly to move freely by unlocking any attachment between the modified power assembly and a part of the mirror base. In step 1110, a motor assembly shield is installed onto the assembly formed in step 1108.

Although the method 1100 can be ordered and performed as described, it is understood that the modified powerfold assembly can be manufactured differently from the explicitly described steps without departing from the scope of this disclosure. It is also understood that the description of method 1100 does not imply an order of installation steps or manufacturing steps of the modified powerfold assembly. Although the method 1100 is described with the aforementioned components, it is also understood that manufacturing the modified powerfold assembly can include additional components, less components, or repeated components, compared to the described components, without departing from the scope of this disclosure. Furthermore, it is understood that the described components can have different mechanical properties without departing from the scope of this disclosure.

The use of sections is not meant to limit the disclosure; each section can apply to any aspect, embodiment, or feature of the disclosure. Where devices are described as having, including, or comprising specific components, or where processes are described as having, including or comprising specific process steps, it is contemplated that devices of the disclosure also consist essentially of, or consist of, the recited components, and that the processes of the disclosure also consist essentially of, or consist of, the recited process steps.

The use of the terms "include," "includes," "including," "have," "has," or "having" should be generally understood as open-ended and non-limiting unless specifically stated otherwise. The use of the singular herein includes the plural (and vice versa) unless specifically stated otherwise. Moreover, the singular forms "a," "an," and "the" include plural forms unless the context clearly dictates otherwise.

The term "about" before a quantitative value includes the specific quantitative value itself, unless specifically stated otherwise. As used herein, the term "about" refers to a ±10% variation from the quantitative value.

It should be understood that the order of steps or order for performing certain actions is immaterial so long as the disclosure remains operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The invention claimed is:

1. A vehicle mirror assembly comprising:
   a mirror base configured to attach one or more accessories comprising a mirror head to the mirror base at an attachment point, the mirror base attachable to a vehicle door; and
   a powerfold assembly comprising:
      a motor configured to move the mirror base;
      a motor assembly shield;
      a powerfold motor frame surrounding the motor; and
      a detent mechanism located between the powerfold assembly and the mirror base;
   wherein the powerfold assembly is located outside of the mirror head in the vehicle door and is configured to allow movement of the mirror base when the mirror base experiences impact.

2. The vehicle mirror assembly of claim 1, wherein the detent mechanism is casted onto the powerfold motor frame.

3. The vehicle mirror assembly of claim 1, wherein the powerfold assembly further comprises:
   one or more first gears;
   a shaft surrounding the one or more first gears;
   a pin configured to attach the detent mechanism to the shaft;

one or more second gears mechanically coupled to the motor and configured to rotate the one or more first gears;
a cap covering an open surface of the motor assembly shield;
a thrust bearing attached to the cap; and
one or more bearings attached to the shaft.

4. The vehicle mirror assembly of claim 3, wherein the detent mechanism is integrated with at least the shaft.

5. The vehicle mirror assembly of claim 1, wherein the allowed movement is rotational.

\* \* \* \* \*